(12) United States Patent
Bennett

(10) Patent No.: US 7,563,065 B1
(45) Date of Patent: Jul. 21, 2009

(54) STORAGE CONTAINER DELIVERY APPARATUS AND METHOD

(76) Inventor: Evron Ray Bennett, 4377 Federal Dr., Greensboro, NC (US) 27410

( * ) Notice: Subject to any disclaimer, the term of this patent is extended or adjusted under 35 U.S.C. 154(b) by 429 days.

(21) Appl. No.: 11/406,154

(22) Filed: Apr. 18, 2006

Related U.S. Application Data

(60) Provisional application No. 60/776,018, filed on Feb. 27, 2006.

(51) Int. Cl.
*B60P 1/02* (2006.01)
(52) U.S. Cl. .......... 414/500; 414/499; 414/541; 414/679
(58) Field of Classification Search .......... 414/499, 414/500, 541, 559, 679
See application file for complete search history.

(56) References Cited

U.S. PATENT DOCUMENTS

| | | | | |
|---|---|---|---|---|
| 3,964,626 A | * | 6/1976 | Arregui | 414/480 |
| 4,290,726 A | | 9/1981 | Sutela et al. | 414/421 |
| 4,409,903 A | | 10/1983 | Wilhelmsson et al. | 104/162 |
| 4,588,345 A | | 5/1986 | Anttila | 414/458 |
| 4,634,336 A | | 1/1987 | Pearce | 414/546 |
| 4,645,406 A | | 2/1987 | Cooper et al. | 414/500 |
| 4,942,971 A | * | 7/1990 | Neugebauer et al. | 220/1.5 |
| 5,203,670 A | | 4/1993 | Yoneda et al. | 414/584 |
| 5,314,289 A | * | 5/1994 | O'Leary | 414/494 |
| 5,662,450 A | * | 9/1997 | Roberts | 414/347 |
| 6,155,770 A | | 12/2000 | Warhurst | 414/498 |
| 6,261,046 B1 | * | 7/2001 | Fryman | 414/410 |
| 6,354,785 B2 | * | 3/2002 | Maeno | 414/477 |
| 6,726,435 B1 | | 4/2004 | Williams et al. | 414/542 |
| 7,037,062 B2 | * | 5/2006 | Oliver | 414/478 |
| 7,497,347 B2 | * | 3/2009 | Norris, Jr. | 220/1.5 |
| 2001/0043851 A1 | | 11/2001 | Kendall | |
| 2004/0191038 A1 | | 9/2004 | Lockamy et al. | |
| 2007/0059133 A1 | * | 3/2007 | Kim | 414/462 |

FOREIGN PATENT DOCUMENTS

EP 422894 A2 * 4/1991

* cited by examiner

*Primary Examiner*—James Keenan
(74) *Attorney, Agent, or Firm*—MacCord Mason PLLC

(57) ABSTRACT

A system for transporting and maintaining a storage container is shown and described. The system comprises a vehicle including a frame capable of receiving a storage container. The system also includes a winch, a container-conveyor, and a lift. The storage container is sized for being removably received by the frame and includes a winch-interface, a container-conveyor-interface, and a lift-interface.

23 Claims, 19 Drawing Sheets

STORAGE CONTAINER DELIVERY APPARATUS AND METHOD

REFERENCE TO PRIOR APPLICATION

The present application claims priority to United States Provisional Patent Application originally filed as a Non-Provisional application on Feb. 27, 2006, and assigned application Ser. No. 11/363,333, and subsequently converted to a provisional application 60/776,018.

TECHNICAL FIELD

The present disclosure relates to storage containers, and in particular, to systems and methods for transporting storage containers.

BACKGROUND INFORMATION

Storage containers are used to ship a wide variety of goods. For example, storage containers may be used to distribute commercial items from one location to another, or to ship furniture from one house to another. Traditionally, such distribution or shipping has been achieved using cargo trucks or tractor trailer trucks with storage containers fixed to the vehicle or to a trailer connected to a vehicle.

With furniture moving, for example, moving companies commonly drive cargo trucks or transfer trailer trucks to the home of the moving customer. These trucks are typically, if space, traffic, and time permits, backed up to the home to facilitate loading. Because the storage areas of these trucks are raised off the ground, additional equipment, e.g. steep ramps or mobile fork lifts, are often necessary to load furniture or goods. Further, because these storage areas are connected to the vehicles, the vehicles are not free to leave until loading is complete. Such additional labor, equipment, and time constraints are undesirable.

Some have used removable storage containers to overcome the aforementioned problems. In such systems, storage containers are removed from the transportation vehicle and placed on the ground, allowing for easier loading of goods and furniture. Such systems eliminate the need for vehicles to remain at the site until loading or unloading is complete, and allow the loading or unloading party to load or unload as need permits. Further such systems may allow storage containers to be located where they could not previously be located because traditional transportation vehicles could not access the site or could not stay long enough to permit loading or unloading.

Often, however, in such removable storage container systems, containers are loaded and unloaded from the vehicle through the use of forklifts or cranes that must be transported to the loading or unloading site. Again, this necessitates additional equipment, which is undesirable. And, if fork lifts, for example, are required to be transported to loading and unloading sites, the additional weight of such equipment will reduce transport capacity and increase fuel consumption.

Similarly, often times it is necessary to unload and then load removable storage containers onto slopes, such as, for example, a driveway on a steep hill. In such situations, if the storage container is returned to a level position too quickly or placed on a slope too quickly, contents in the storage container can shift and become damaged Others have tried to develop systems to load and unload a storage container from a vehicle without the use of an external forklift or crane, such as, for example, by using ramps or tilt-loading. Such systems can cause goods to shift during loading and unloading, resulting in damage. For various other reasons, these prior attempts have had various additional short comings.

Thus, there exists a need for a system capable of loading and unloading a storage container with respect to a transport vehicle, wherein the system is capable of deploying and retrieving the container with respect to a location on the ground or other surface. Such a system should be able to load and unload the storage container so it stays substantially level. Such a system should also be able to exhibit a high degree of control over the horizontal plane of the storage container.

SUMMARY

The present invention includes a vehicle with a frame capable of receiving a storage container. In a preferred embodiment, the vehicle may be a truck where the frame capable of receiving a storage container is the bed of the truck. In another embodiment, the vehicle may be a transfer trailer truck, where the frame capable of receiving a storage container is the trailer.

A storage container is sized for being removably received by the vehicle frame and includes a winch-interface, a container-conveyor-interface, and a lift-interface. In one embodiment, a winch-interface is at least one ear, or projected part, connected to the top of the storage container; a container-conveyor-interface is an opening defined by the container; and a lift-interface is a grip.

A winch connected to the vehicle, or alternatively to the trailer of the vehicle connects to the winch-interface of the storage container and winches the storage container through a cable. The winch can be used to help raise the storage container, help lower the storage container, help maintain the storage container in a substantially level position, and help regulate the horizontal plane of the storage container.

A container-conveyor connects to the vehicle, or alternatively to a trailer of the vehicle, and is capable of engaging the container-conveyor-interface of the storage container. In a preferred embodiment, the container-conveyor is a screw-conveyor capable of moving the container on the surface of the frame.

A lift connects to the vehicle and is capable of connecting to the lift-interface of the storage container. In a preferred embodiment, the lift is hydraulic, and includes at least one clasp for connecting to a corresponding grip on the storage container.

Additional advantages of the present invention will be apparent from the detailed description of the preferred embodiment thereof, which proceeds with references to the accompanying drawings.

BRIEF DESCRIPTION OF THE DRAWINGS IN ACCORDANCE WITH AN EMBODIMENT OF THE INVENTION

DETAILED DESCRIPTION OF EXAMPLES OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
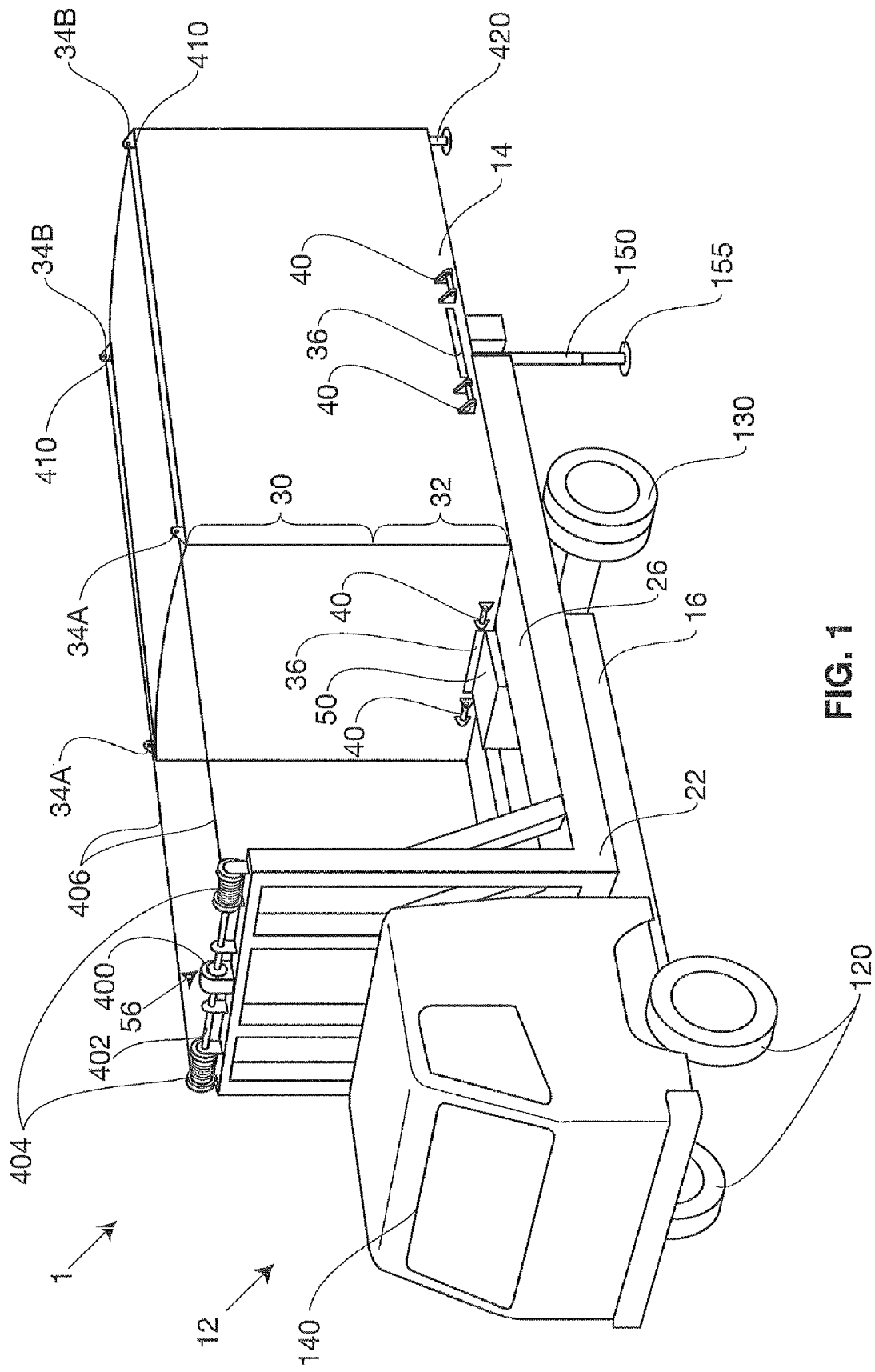
FIG. 1 is a perspective view of a vehicle with a storage container located on a frame in accordance with an embodiment of the invention.

FIG. 1 shows a view of an embodiment of a system 1 of the present invention. The system 1 includes a vehicle 12, a storage container 14 and a loading apparatus that includes a container-conveyor 50, a winch 56, and a lift 60.

In this embodiment, the vehicle 12 is a truck 12, which includes a frame 16 extending between a cab 140 on a forward set of wheels 120 and rearward set of wheels 130. The frame 16 includes an upper-fore portion 20, a lower-fore portion 22, a lower-rear portion 24, and a base 26, and is capable of supporting a storage container 14. Though the vehicle 12 depicted is a truck 12, one skilled in the art would recognize that the vehicle 12 may comprise a variety of other transporters within the spirit and scope of the present invention. In other embodiments, for example, the vehicle may be a tractor trailer truck, and the frame may be the trailer of a tractor trailer truck.

The frame 16 may include two or more support members 150 attached to the frame and, in some instances, toward the corners of the frame. The support members 150 may be individually extendable, with each having a foot 155 configured to extend to and engage the ground so as to provide stability and/or facilitate leveling of all or part of the frame 16 with respect to the ground. One skilled in the art will appreciate that such support members 150 may comprise and be operated by, for example, an appropriate hydraulic system, a chain/sprocket arrangement, electric or pneumatic devices, or any other device capable of extending the support members 150 to engage the ground and support and/or level all or part of the frame 16.

Figure 2:
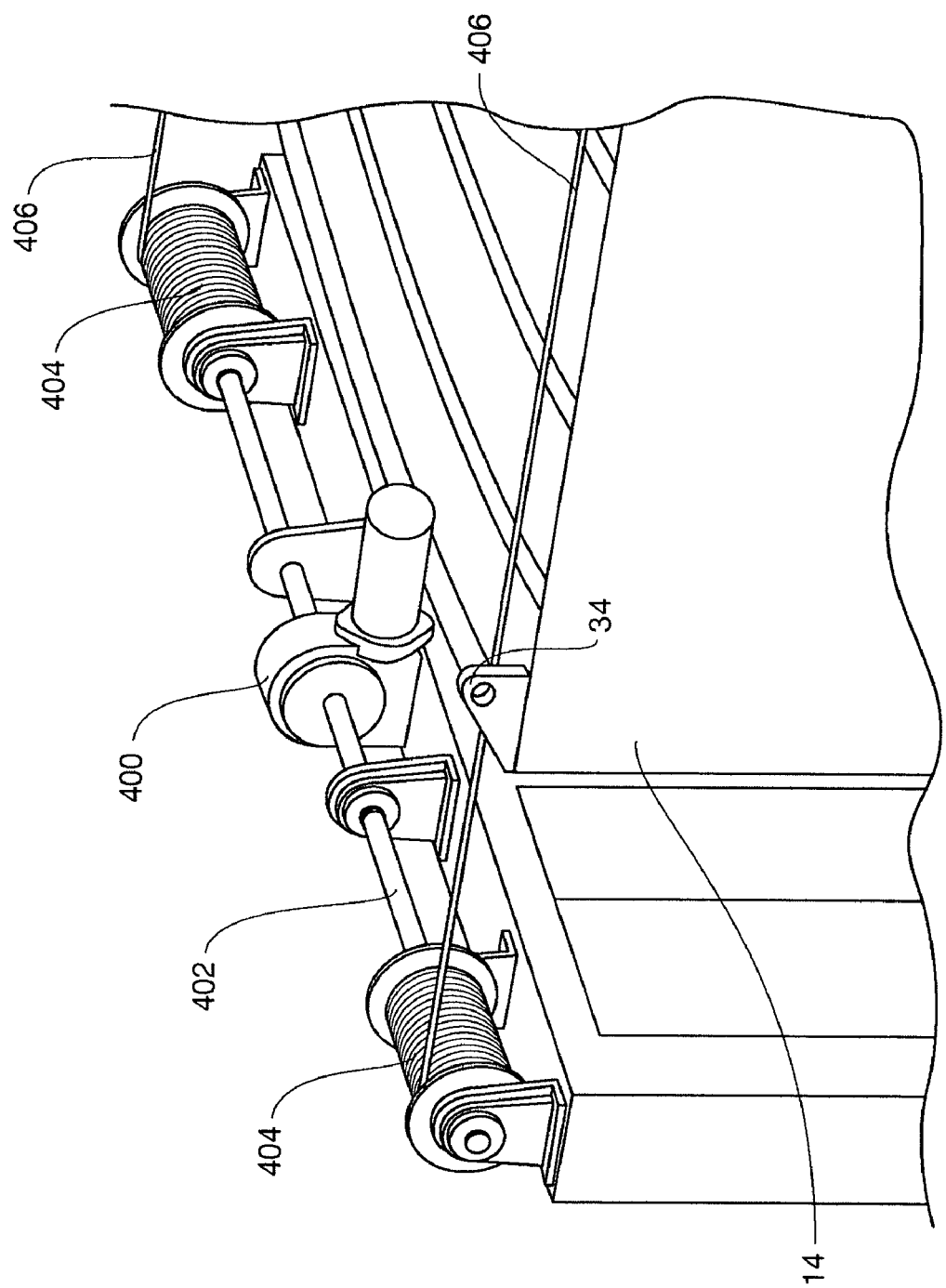
FIG. 2 is a close-up view of a winch component of the embodiment of FIG. 1.

A preferred loading apparatus of the system includes a winch 56, a container-conveyor 50, and a lift 60. The winch 56 is mounted on the upper-fore portion 20 of the frame 16. In one embodiment, the winch 56 includes a motor 400, a shaft 402 turned by the motor 400, at least one spool 404 driven by the shaft 402, and at least one cable 406 wound around the spool 404. The cable 406 includes fasteners 410 at one end. The container-conveyor 50 of the loading apparatus is mounted on the frame near the base 26. The lift 60 of the loading apparatus is mounted to the lower-rear portion 24 of the frame 16. Those skilled in the art would recognize that a variety of winch configurations could be used to achieve the present invention, for example, any number of spools, motors, and cables could be combined. Similarly, those skilled in the art will recognize that various cable, belt, rope, or chain take-up mechanisms can be used, all of which are considered as encompassed by the term "winch". FIG. 2 shows another view of the winch 56 of the current embodiment.

The storage container 14 has an upper-region 30 and a lower-region 32. The storage container includes a winch-interface 34 located at the upper-region 30, a container-conveyor-interface 36 located at the lower-region 32, and a lift-interface 40 located at the lower-region 32. The container 14 may also have container feet 420.

In the embodiment depicted, the winch-interface is a perforated ear 34 connected near the corners of the upper-region 30 of the storage container 14. Generally, any ear or anchor point that allows for the cable extending from the winch 56 to be connected to the storage container 14 could be used as a winch-interface. Those skilled in the art could achieve such winch connection with a clasp, a hoop, a flange or an opening in the storage container, by way of example but not limitation.

The container-conveyor-interface 36 of the storage container 14 includes an opening 36 in the container 14, whereby the opening 36 is capable of engagably receiving protruding short forks 240A (See FIG. 4) on the container-conveyor 50. In this embodiment, the container-conveyor-interface opening 36 is located at the lower-region 32 of the storage container 14. More preferably, a lower flange on the container 14 that supports the main body of the container 14 off the ground has the opening 36. The opening 36 could be on multiple sides of the storage container 14, thereby allowing the container to be conveyed from a desired side. Others may prefer to build a container where the container-conveyor-interface is the surface of the container 14 or the lift-interface and conveying could be achieved without the need for opening 36. Still others may prefer other interfaces. These are all considered to be within the scope of the invention.

The lift-interface 40 of the storage container 14, in one embodiment, is a grip 40. The grip 40 includes a bar having first and second ends slightly spaced from the lower-region 32 of the storage container 14. The lift-interfaces 40 may be positioned on multiple sides of the container 14 to allow for lifting from a variety of sides. While the lift-interface 40 is depicted as a grip, a variety of other lift-interfaces could be used in the present invention, for example, a flange or an opening in the container 14 could be used.

Figure 3:
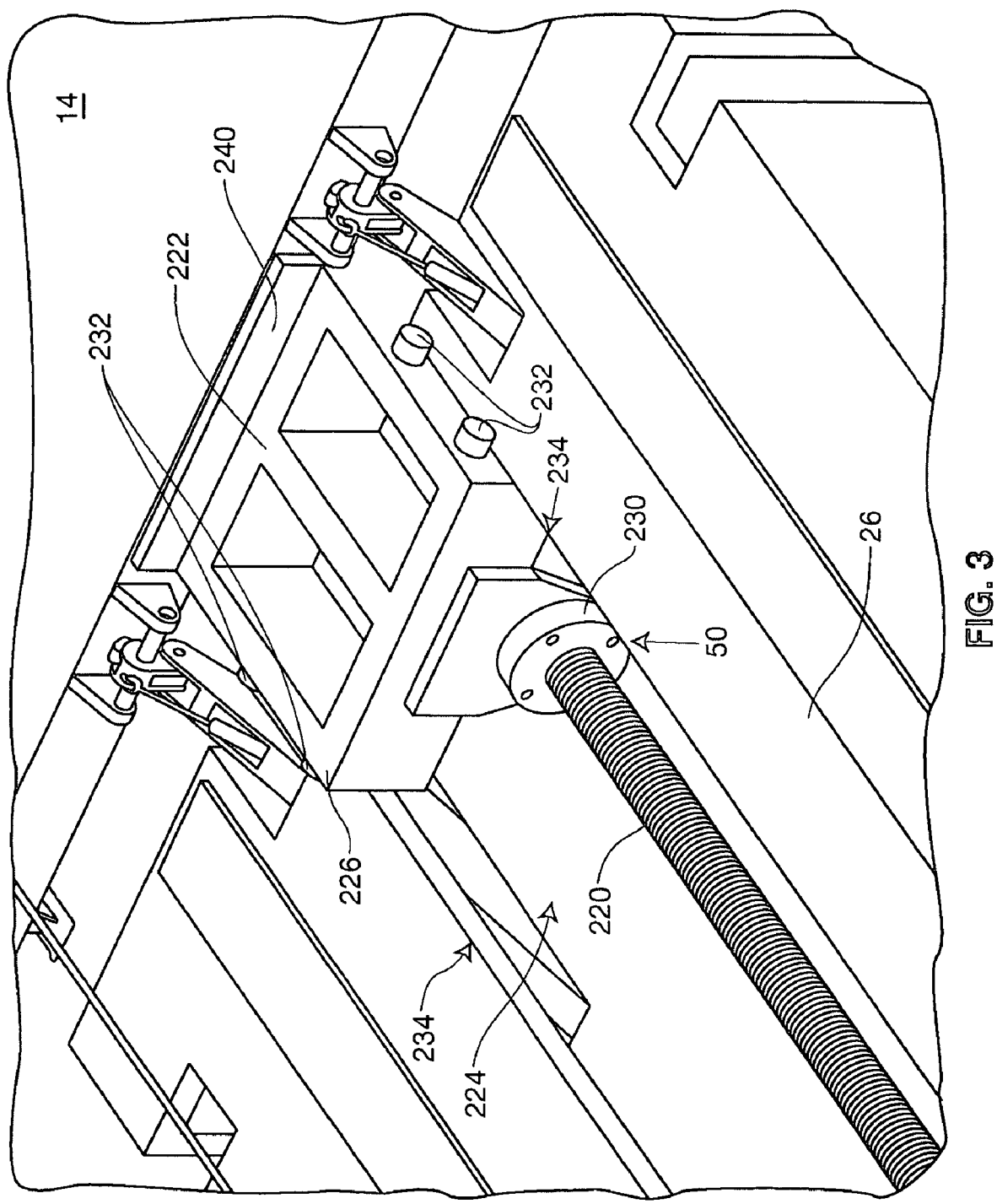
FIG. 3 is a close-up view of a container-conveyor of the embodiment of FIG. 1.

FIG. 3 shows a preferred embodiment of the container-conveyor 50, in which the container-conveyor 50 is a screw-conveyor 50 including a threaded-shaft 220, driven to rotate by a motor (not shown). The motor may be the engine of the vehicle or a supplemental motor. Others may prefer to use another conveyor, such as, for example, a chain/sprocket arrangement, an electric, a hydraulic, or a pneumatic device. The screw-conveyor has the advantage of not requiring elements to extend beyond the frame 26, as may occur with a hydraulic or pneumatic variation. In this embodiment, the screw-conveyor 50 includes a mobile member 222. The mobile member 222 includes a member body 226 fitted into a channel 224 in the base 26. Rollers 232 protrude from the sides of the member body 226 and rest on edges 234 of the channel 224 to reduce friction during movement of the mobile member 222. A substantially vertical lip 240 on the member body 226 increases surface area in contact with the container 14 and thereby distributes force and reduces pressure on the container 14. The threaded shaft 220 is located in the channel 224. A thread-casing 230 on the member body 226 is threaded on the threaded-shaft 220 for converting the rotational force of the shaft 220 to linear force. As the shaft 220 rotates in one direction, the mobile member 222 moves axially along the shaft 220 in a first direction and as the shaft 220 rotates in the other direction, the mobile member 222 moves in the reverse axial direction.

Figure 4:
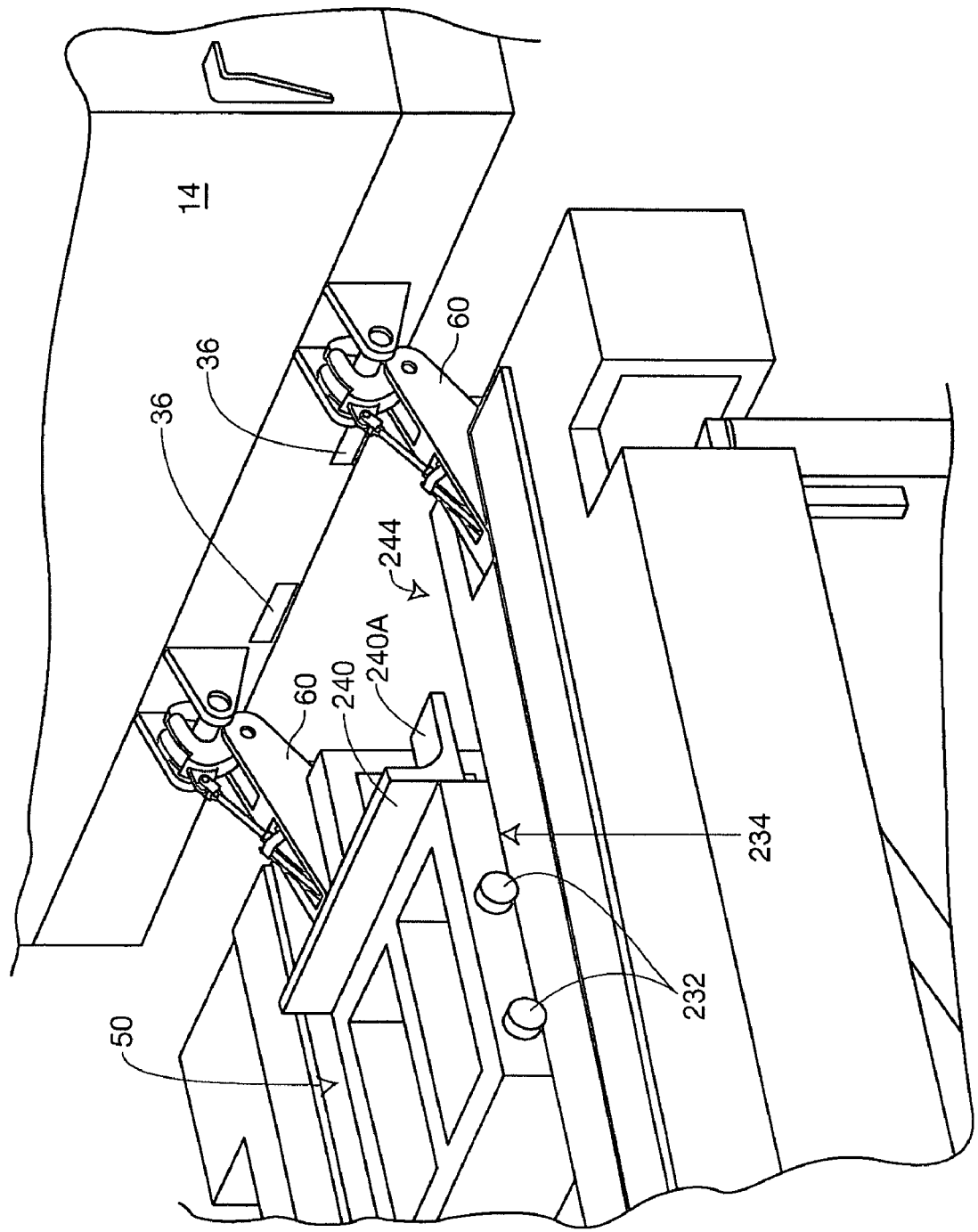
FIG. 4 is a close-up view of a screw conveyor and of a lift engaging the grip of a storage container of the embodiment of FIG. 1.

FIG. 4 shows another view of a screw-conveyor 50 not connected with container 14. This view shows a part of fork or lip 240A that was not visible in previous figures. The lips 240A are designed to be slidably receivable in the container-conveyor-interface 36 openings. During loading the lift 60 may raise a container 14 to a level that allows the lip 240A to slide into the container-conveyor-interface 36, whereby friction creates connection. During unloading, once the lift has connected with and supports the container, the mobile member 222 can be retracted to withdraw the lips 240A from the container. Others may prefer to include a flange (not shown) on the lip 240A, to further facilitate connection, whereby the flange abuts an internal portion of the container-conveyor-interface 36 further facilitating connection. Those skilled in the art may desire other means to further facilitate connection within the scope of the invention.

Figure 5:
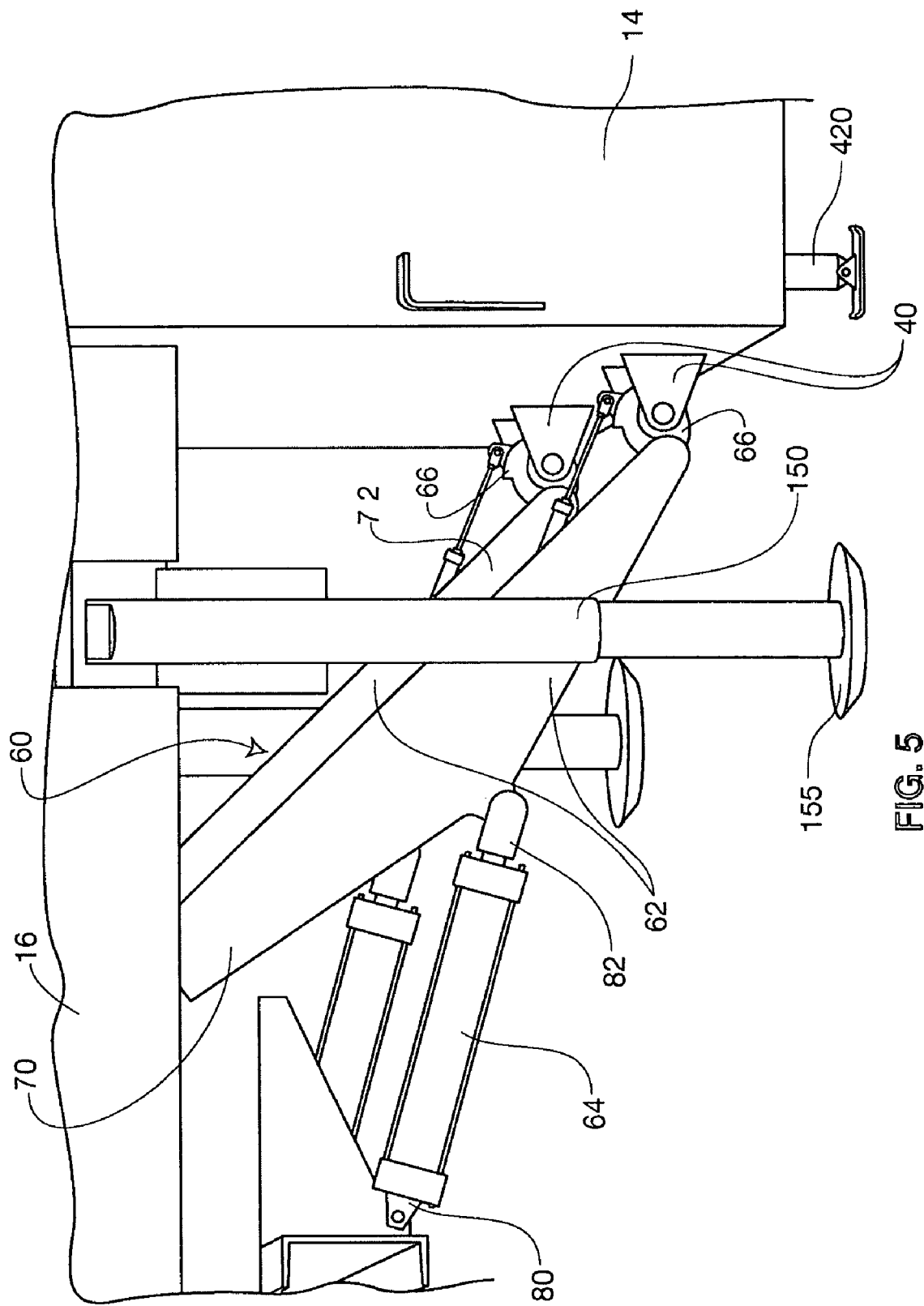
FIG. 5 is a side perspective view of a lift engaging the grip of a storage container of the embodiment of FIG. 1.

FIG. 5 shows another view of the preferred lift 60 of the present invention, wherein the lift 60 has grasped a container 14. The lift 60 is in a lowered position and the container 14 is on the ground, resting on feet 420. The lift 60 includes a pair of lift-arms 62. Each lift-arm 62 has a first end 70 pivotally connected to the frame 16 and a second end 72 connected to container-engager 66, which is, in this embodiment, a clasp 66. A lift-drive 64 has a first end 80 pivotally connected to the frame 16 and a second end 82 pivotally connected to lift-arms 62. In the preferred embodiment the lift-drive 64 is hydraulic, but, still within the scope of the invention, others may prefer other drives, such as pneumatic, for example.

Figure 6:
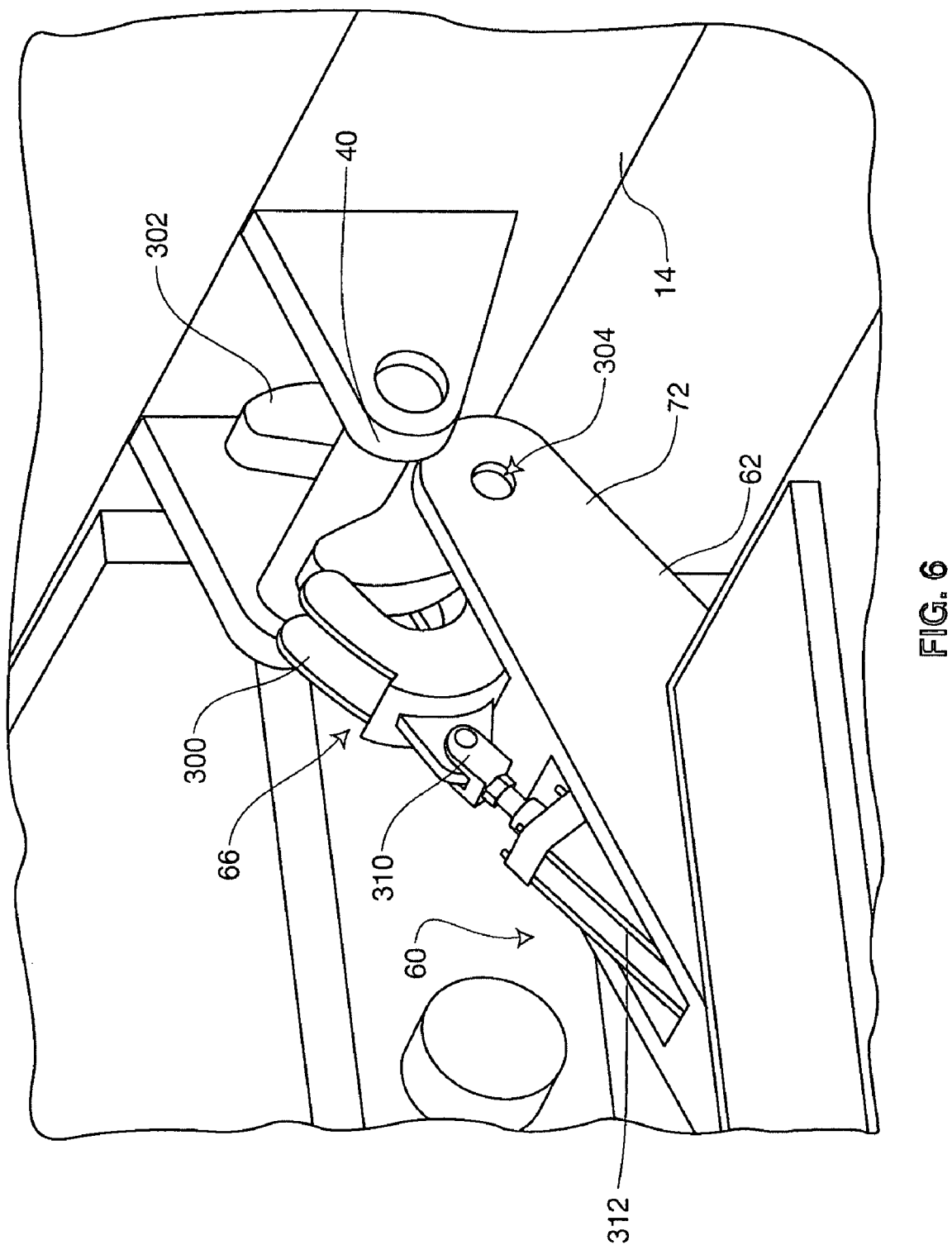
FIG. 6 is a close-up view of a clasp of a lift of the embodiment of FIG. 1.

FIG. 6 shows a close-up view of a clasp 66, of the lift 60, and a container 14. The clasp 66 includes a top jaw 300 and a bottom jaw 302 for securely grasping the grip 40 on the container 14. In this embodiment of the clasp 66, the top jaw 300 is pivotally connected to both the second end 72 of the lift-arm 62 and to the bottom jaw 302 at a pivot point 304. A hydraulic drive 312 is mounted to open and close the clasp 66 and attaches to the top jaw 300 at pivot point 310. A grip 40 of the container 14 rests in the bottom jaw 302 of the clasp 66. By closing the top jaw 300 through the hydraulic drive 312, the grip 40 is held by the clasp 66.

Figure 7:
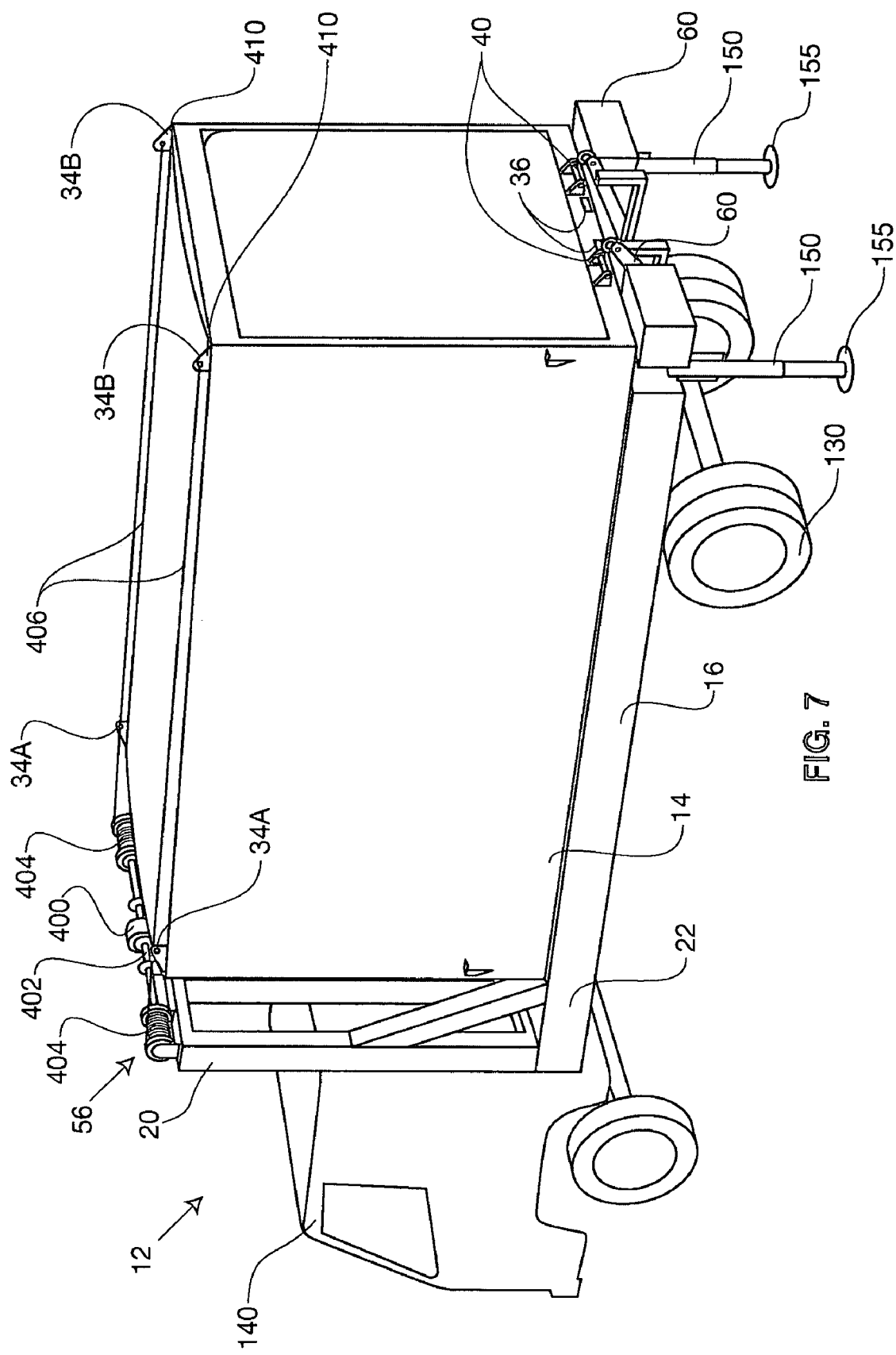
FIGS. 7-10 are perspective views of a storage container being loading or unloaded relative to a vehicle.

To more fully understand the present invention, the unloading process for the preferred embodiment is briefly described herein. FIG. 7 shows a truck 12 of the present invention, which has, for example, arrived to a site where the storage container 14 is to be unloaded from the frame 16 of the truck. The cable-end of winch 56 is connected to a distal winch-interface 34B. At this time the lift 60 does not grasp the storage container 14. Frame-support-members 150 are lowered to the ground to provide more support and stability. After that happens, the container-conveyor 50 is activated to push the container rearwardly. The motor drives the shaft 220, so that the casing 230 translates the rotation to linear movement of the mobile member 222 to drive the container 14 to the rear. At the same time, the winch 56 pays out the cable 406 at a rate to maintain tension at the rear of the container 14 and to permit rearward movement. Coordinating the winch 56 pay-out and the drive rotation of the conveyor 50 can be achieved using conventional motor controls and/or micro processing controls.

Figure 8:
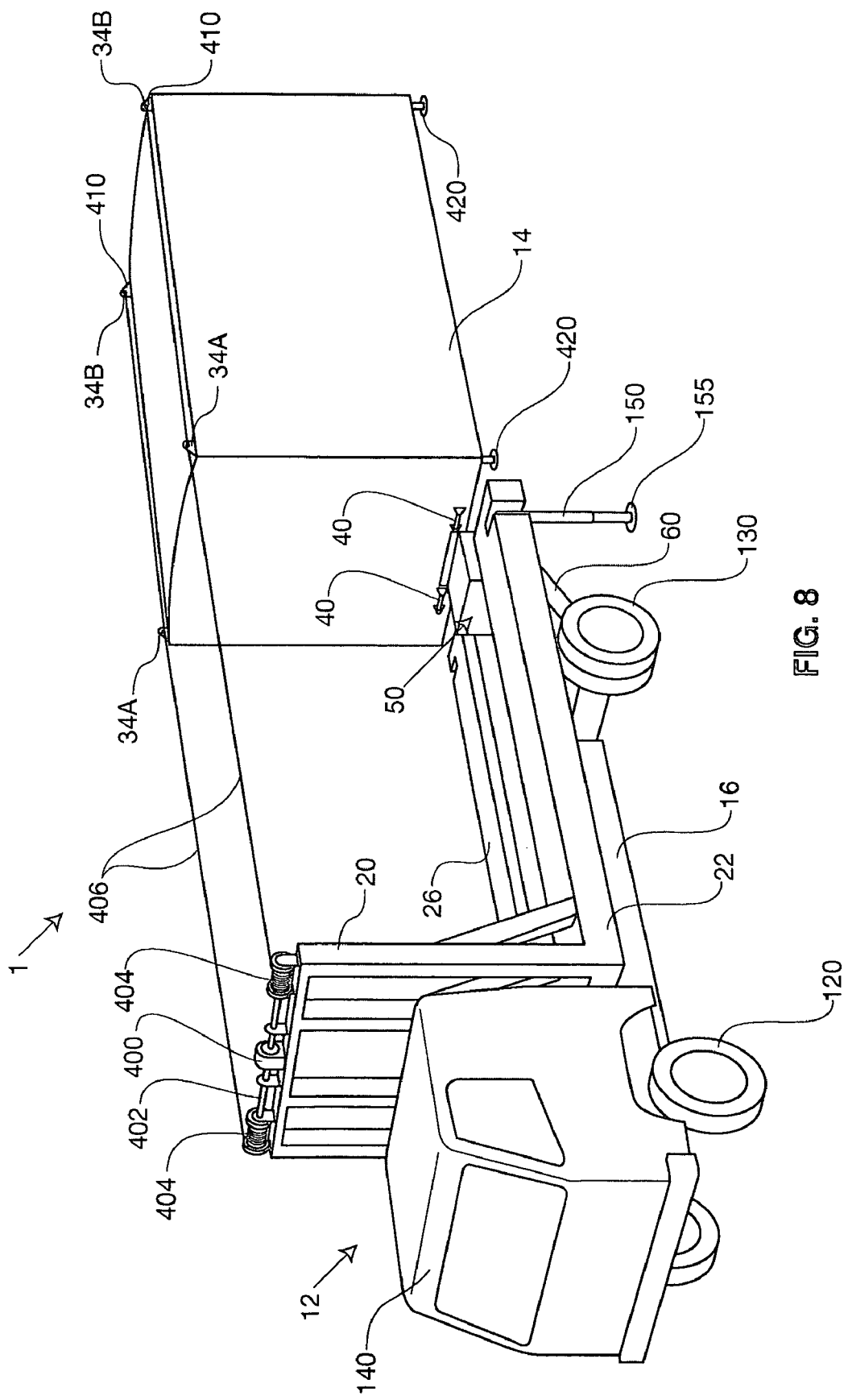

FIG. 8 shows the storage container 14 moved to the end of a frame 16. The cable 406 paid out from winch 56 connects to the distal winch-interface 34B, and provides support for the storage container. As seen in FIG. 8, the winch-interface 34B at the rear of the container 14 is thus supported by tension through the cable 406. The front of the container 14 rests on the base 26 and/or the mobile member 222, thereby maintaining the storage container 14 in a substantially level position as the container 14 is moved off the rear of the base 16. The container-conveyor 50 is connected with the container 14. The figure depicts a moment prior to the lift 60 connecting to the lift-interface 40 of the container. Once the lift 60 grasps the grips 40, the mobile member 222 may be moved forwardly, so the weight of the front of the container 14 is born by the lift 60.

Figure 9:
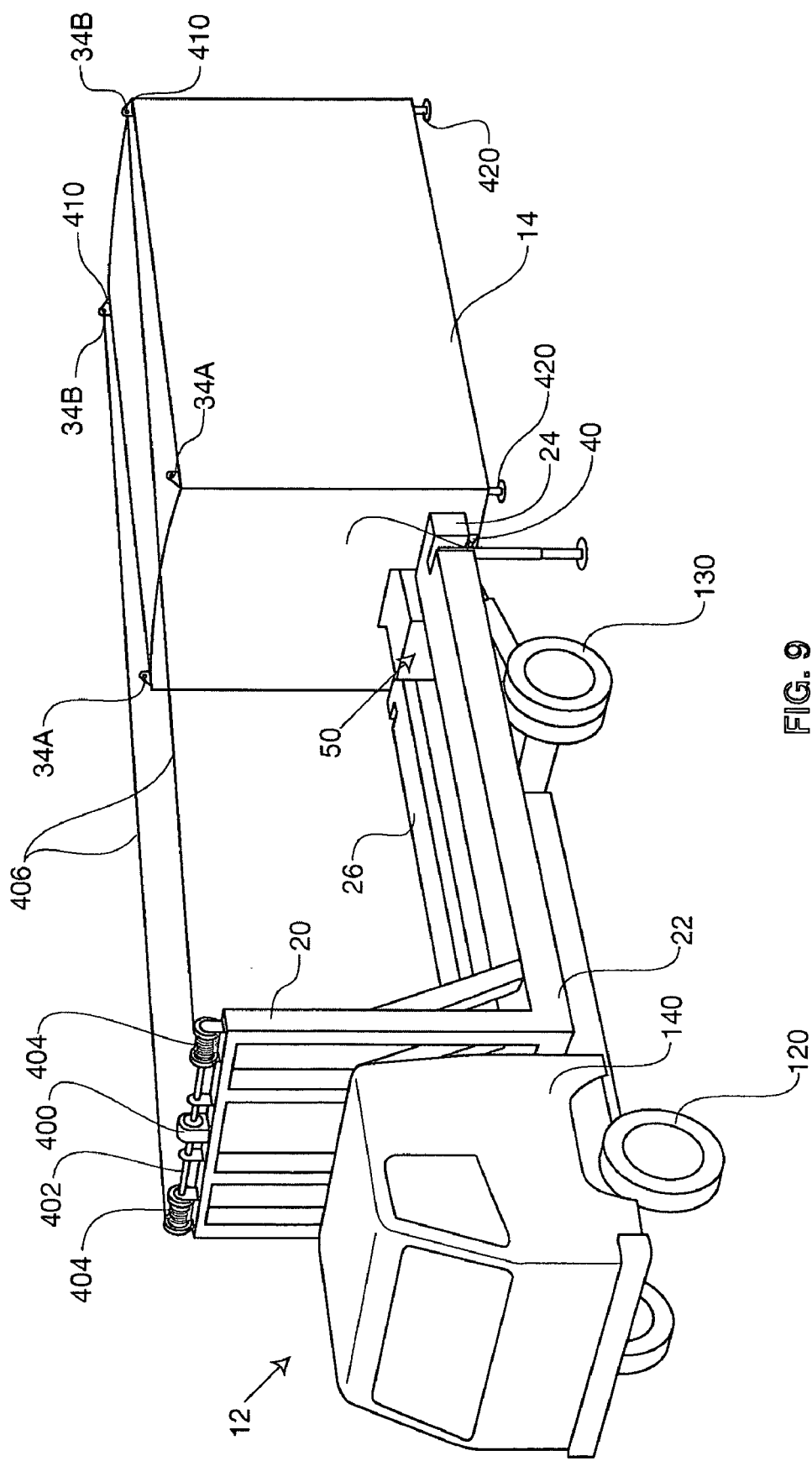
Figure 10:
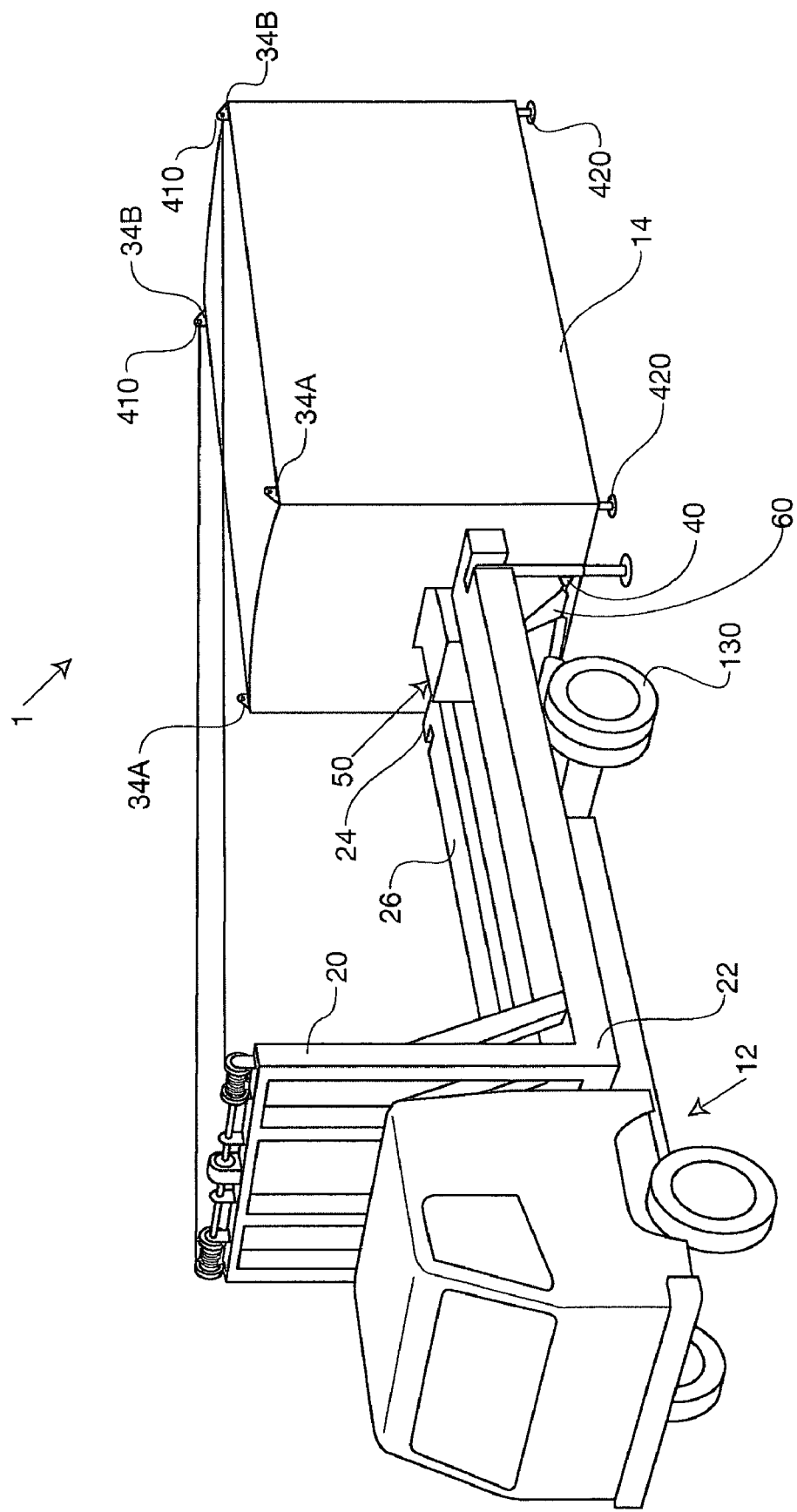

FIG. 9 shows the storage container 14 being relocated by the lift 60 operating in conjunction with the winch 56. Because this description is representative of unloading, the relocating is the lowering of the storage container 14. FIG. 10 shows the storage container 14 on the ground 16. Both the winch 56 and lift 60 are still connected. Both would normally be disconnected from the container 14 prior to leaving the storage container 14.

The container-loading procedure is similar to the unloading procedure and is described using the same figures, essentially in reverse. FIG. 10 shows the vehicle 12 backed up to a container 14 resting on the ground 16. Support members 150 are lowered to provide additional support. Once the vehicle 12 is properly positioned, the lift 60 is connected to the lift-interface 40 and the winch 56 is connected to the distal winch-interface 34B. FIG. 9 shows the lift 60 operating in conjunction with the winch 56 to raise the container 14 off the ground. FIG. 8 shows the container 14 raised off the ground. To connect the container-conveyor 50 to the container 14, the openings of the container-conveyor interface 36 are aligned with the forks 240A of the mobile member 222. The mobile member 222 is then activated to move rearwardly to insert the forks 240A into openings 36 so the container 14 is connected to the container-conveyor 50. The lift 60 is disconnected by opening the clasp 66. This is accomplished by retracting the grip drive 312 so the top jaw 300 pivots away from the bottom jaw 302. Then the lift-drive 64 can be retracted to lower the bottom jaw 300 away from the grips 40. Activation of the winch 56 winds the cable 406 to pull the container 14 over the flat-bed base 26. The container 14 may be maintained substantially level throughout the raising process and during the transition from lift 60 connection to container-conveyor 50 connection. FIG. 7 shows the container 14 moved onto the frame 16 by the container-conveyor 50 typically operating in conjunction with the winch 56. After raising the support members 150, the truck 12 is ready for departure.

Figure 11:
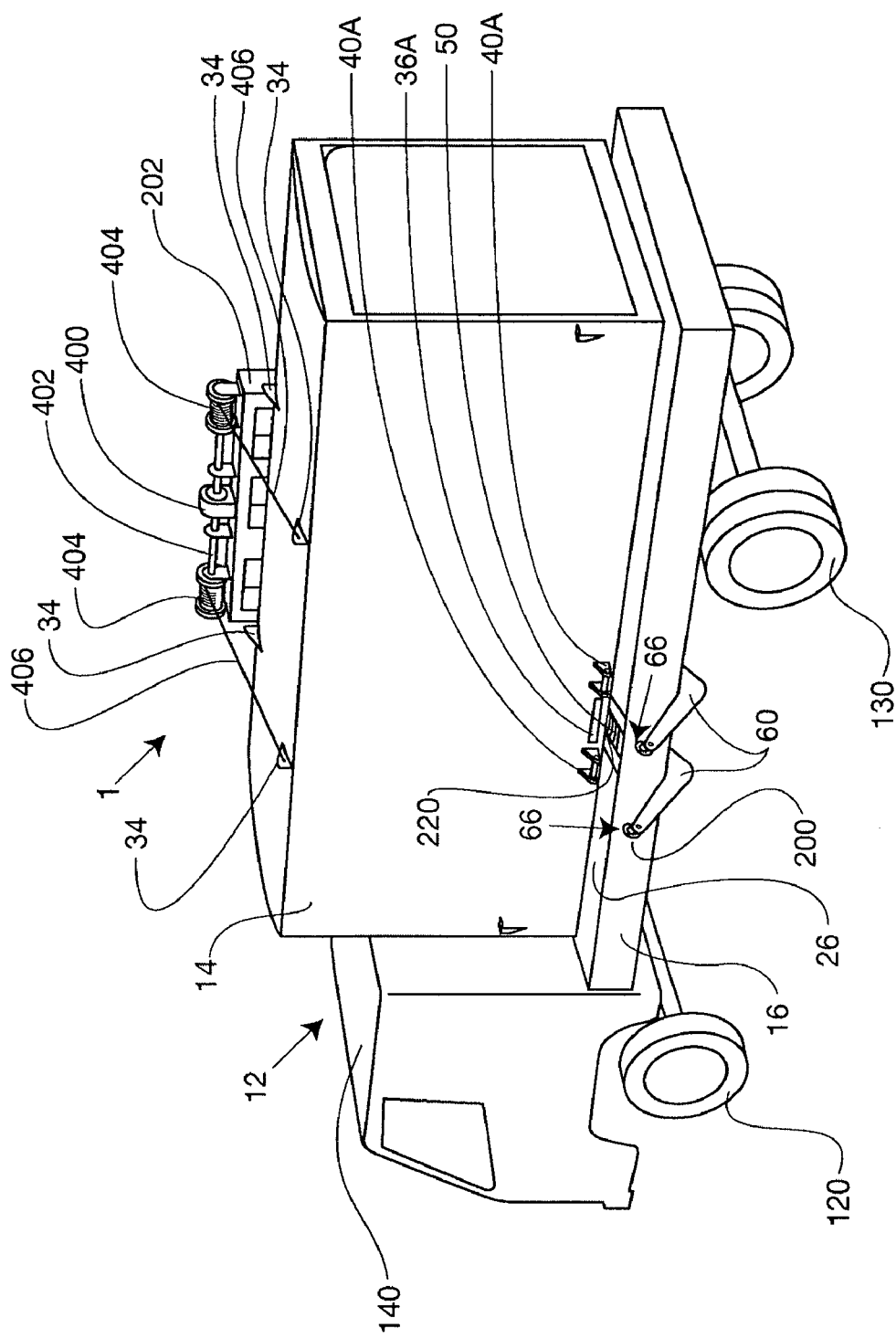
FIG. 11 is a view of another embodiment of a vehicle with a storage container located on a frame.

FIG. 11 shows another embodiment of the present invention. In this embodiment, the loading-apparatus is oriented right to left (or left to right, as desired) across the frame 16 rather than front to rear along the frame 16. Such a configuration facilitates side loading and unloading of storage container onto a vehicle 12. The ability to side load a container is beneficial, for example, for loading and unloading storage containers onto the sidewalk of a street too narrow to facilitate proper backing of the vehicle. Those skilled in the art would recognize that a vehicle of the present invention could be configured with both a loading-apparatus oriented along the frame as well as a loading apparatus oriented across the frame.

In the embodiment depicted by FIG. 11, which is somewhat similar to the previously described embodiments, the loading-apparatus includes a screw-conveyor 50 connected across the base 26, a lift 60 connected about the lower-first-side portion 200 of the frame 16, and a winch connected about the upper-second-side portion 202 of the frame 16. The container 14 has winch-interfaces 34; container-conveyor-interfaces 36A, on one side of the container 14, and 36B (not visible), on the opposite side of the container; and lift-interfaces 40A, on one side of the container, and 40B (not visible) on the opposite side of the container. Winch-interfaces 34, container-conveyor-interfaces 36, and lift-interfaces 40 are positioned on multiple sides of the container 14 to facilitate loading and unloading from a variety of sides.

The screw-conveyor 50 includes a threaded-shaft 220, which rotates. The screw-conveyor 50 includes a threaded mobile member 222 (not visible in this figure) under the control of the screw-conveyor 50. As the shaft rotates in one direction, mobile member 222 moves in a first direction. As the shaft rotates in the other direction, the mobile member 222 moves in the opposite direction. The mobile member 222 (not visible in this figure) engages a container-conveyor-interface opening 36B (not visible in this figure) through which the screw-conveyor 50 is capable of pushing and pulling the container 14 across the base 26. The lift 60 connects to the lift-interface 40B (not visible in this figure). The loading and unloading process is generally similar the process described with the previous embodiment, with one exception being that loading and unloading of the storage container 14 occurs across the frame 16 from side to side.

Figure 12:
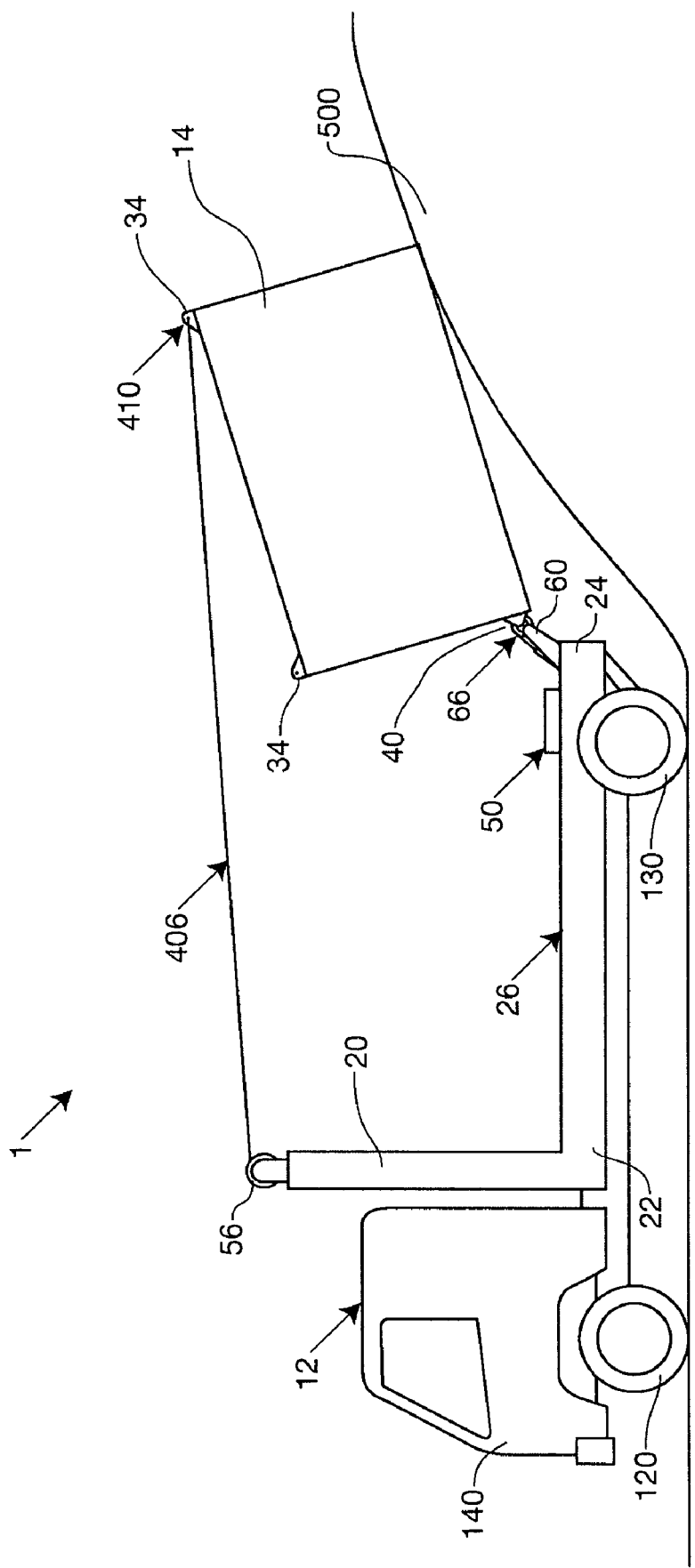
FIG. 12 is a view of a vehicle regulating the attitude of a storage container.

The present invention can also be used to regulate a storage container's attitude, or orientation of a container's axes relative to a reference line or plane, such as the horizon or ground. While in the majority of cases, maintaining the storage container substantially level is the objective, in some cases, such as hill locations, other attitudes may be useful. FIG. 12 shows a vehicle 12 adjusting the attitude of a storage container 14 to be more safely relocated on the slope of a hill 500, for example, and could depict either the lifting or lowering of a storage container 14. While the hill 500 shown is sloping upward, the present invention could also be used to place a storage container on a downward sloping hill. This may be accomplished by a sideward mounting of the winch interface 34 so the cable 406 can pass to the side of the container 14. The storage container 14 is connected to a lift 60 and a winch 56, and regulated, in this example, by using the winch 56 to pay out the desired amount of cable 406, at the desired speed, thereby allowing the storage container 14 to pivot at the lift 60 to the desired attitude.

The present invention may be also be sold as a kit for improving more traditional storage container transport vehicles or for modifying traditional trucks or other vehicles. Some may find the kit to be a preferable means of practicing the present invention because it may reduce overall cost. FIGS. 13 through 19 show various embodiments of the present invention that can be provided as a kit or as kit components. Those skilled in the art will recognize, however, that elements shown in the following figures may be applicable to other, non-kit, embodiments of the present invention as well.

Figure 13:
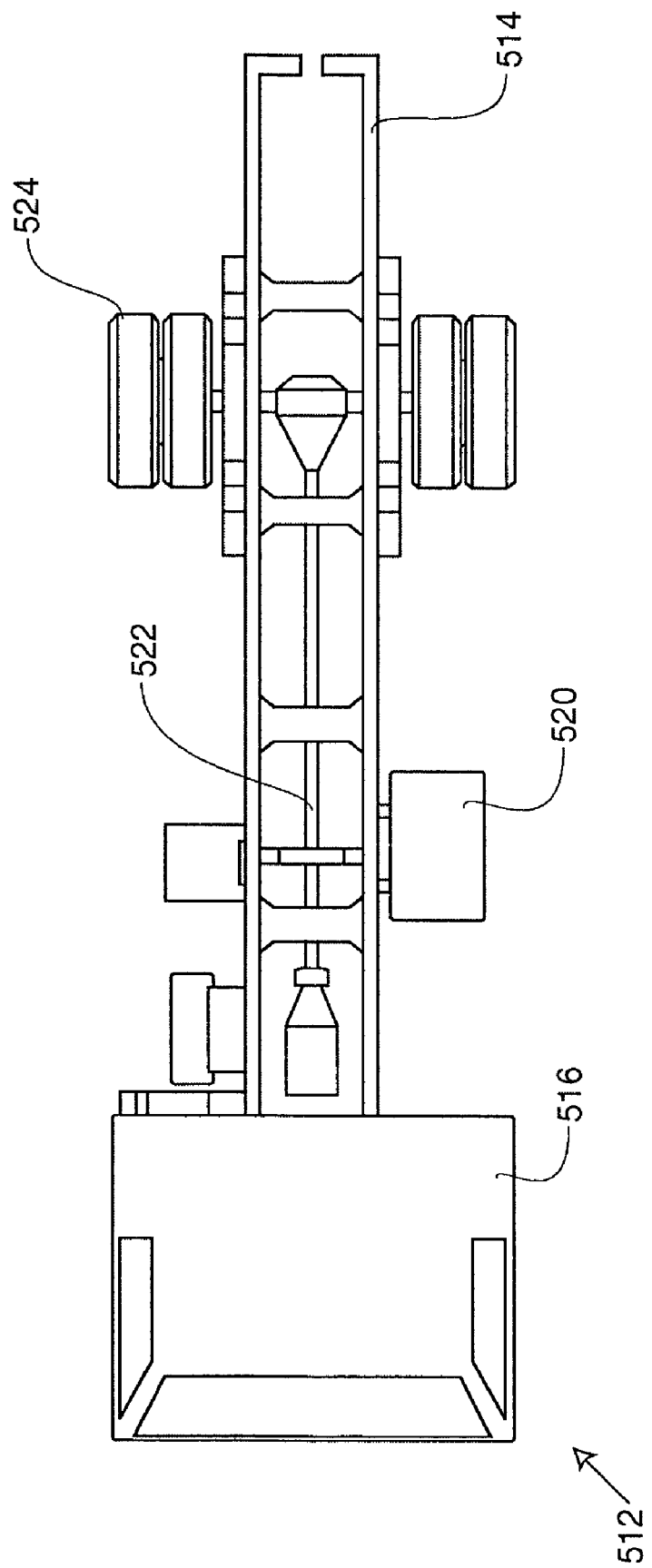
FIG. 13 is a view of a truck that has been modified to receive components of one embodiment of the present invention.

FIG. 13 shows a preferred embodiment of a truck 512 that has been modified to receive the kit components of the present invention. In this embodiment, a truck bed (not shown) has been removed, revealing truck frame 526 with an attached cab 516. Truck components, such as the gas tank 520, drive train 522, and rear wheels 524 are also visible. While this figure shows an embodiment that has been modified to receive the components of the present invention, others may prefer not to modify their trucks prior to receiving components of the kit of the present invention, which would be within the scope of the present invention.

Figure 14:
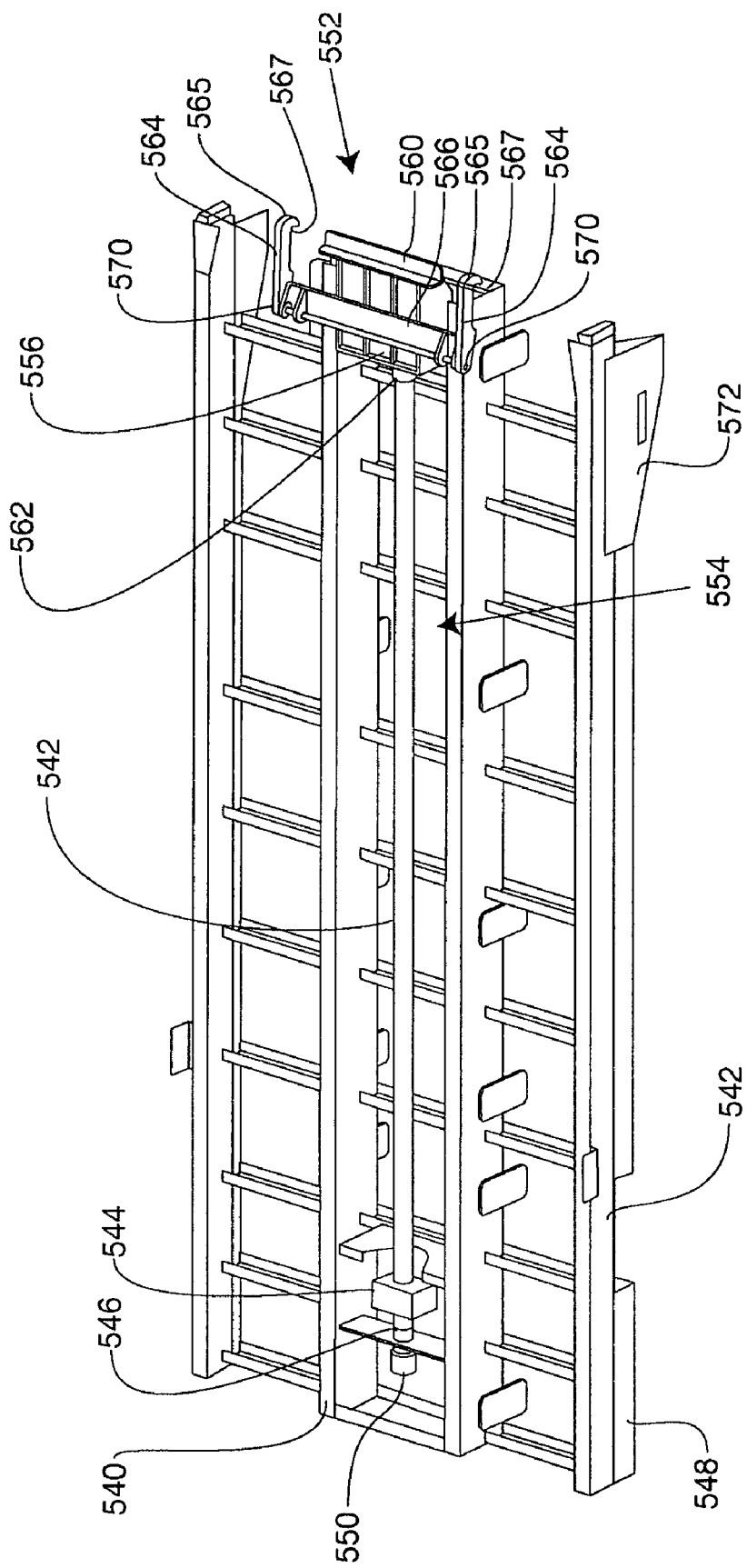
FIG. 14 is a view of an embodiment of the container-conveyor of the invention.

FIG. 14 shows a preferred embodiment of the container-conveyor 540 of the invention. Container-conveyor 540 is attached to a mountable frame 542 and adapted to be mounted to a vehicle. In this embodiment, mountable frame 542 is for mounting to truck frame 526 shown in FIG. 12, or to similar frames. The mountable frame 542 may be mountable through weldments 548, or through other parts of mountable frame 542. Still others having different vehicle configurations may prefer to attach the container-conveyor to the vehicle frame without mountable frame 542, which would be within the scope of the present invention.

Container-conveyor 540 includes a shaft 542, preferably a threaded shaft, and more preferably a power AC ACME screw. Container-conveyor 540 also includes a screw bearing 544, a gear coupling 546, and a motor attachment 550. Any number of motors may be connected to motor attachment 550, and in some embodiments motor attachments may be driven through the vehicle motor; applicant, however, prefers a hydraulic motor assembly (not shown in this figure). Mobile member 552 fits into channel 554. Mobile member 552 includes a member body 556, and a lip 560 connected to the member body 556. A bolt or thread casing 562 is attached to member body 556 and threads onto shaft 542 for converting rotational movement of shaft 542 into linear movement of mobile member 552. Mountable frame 542 may also include a control panel 572 for locating controls to operate the various components of the invention.

In this preferred embodiment, mobile member 552 also includes member-clasps 564 for clasping grips of the storage container (not shown in this figure). Member-clasps 564 are connected to mobile member through plate 566. Member-clasps 564, in this embodiment, include clasp-head 565 and clasp-back 567, and are pivotally connected to plate 566 at pivot points 570 to facilitate mobile member 552 attachment to the storage container. Member-clasps 564 are positioned to engage storage container grips (not shown in this figure), for example, they are laterally positioned at the same approximate width of as the grips. In this embodiment, when the lift (not shown in this figure) raises the storage container to the appropriate level, the mobile member 552 is moved rearwardly allowing lip 560 to contact container-conveyor-interface (not shown in this picture) of the storage container. At the same time, as the clasp-head 565 of member-clasp 564 contact the grip, the curvature of clasp-head 565 allows member-clasp 564 to ride up and over the grip by pivoting at point 570. Once clasp-head 565 rides over the grip, gravity drops member-clasp down and clasp-back 567 engages member-clasp 564 with the grip. When the mobile member 552 is activated to move forward, member-clasp 564 engages or clasps the grip and helps pull the storage container forward. Forward movement may also be facilitated by winch retraction or additional lip 560 support.

In terms of unloading, preferably clasp-back 567 is shaped to allow the grip to disengage from the member-clasp as the storage container is lowered by the lift. Further, because preferred member-clasps do not require mechanization, member-clasps can easily be added to other embodiments, for example embodiments shown in FIGS. 1,11-12 by attaching plate 566 to the various mobile members. Many may find such a configuration preferable.

Still others, in other embodiments, may prefer to use a mechanized member-clasp that is capable of being mechanically raised and lowered to engage and disengage the grips of the storage container. Such clasps would also be within the scope of the present invention.

Figure 15:
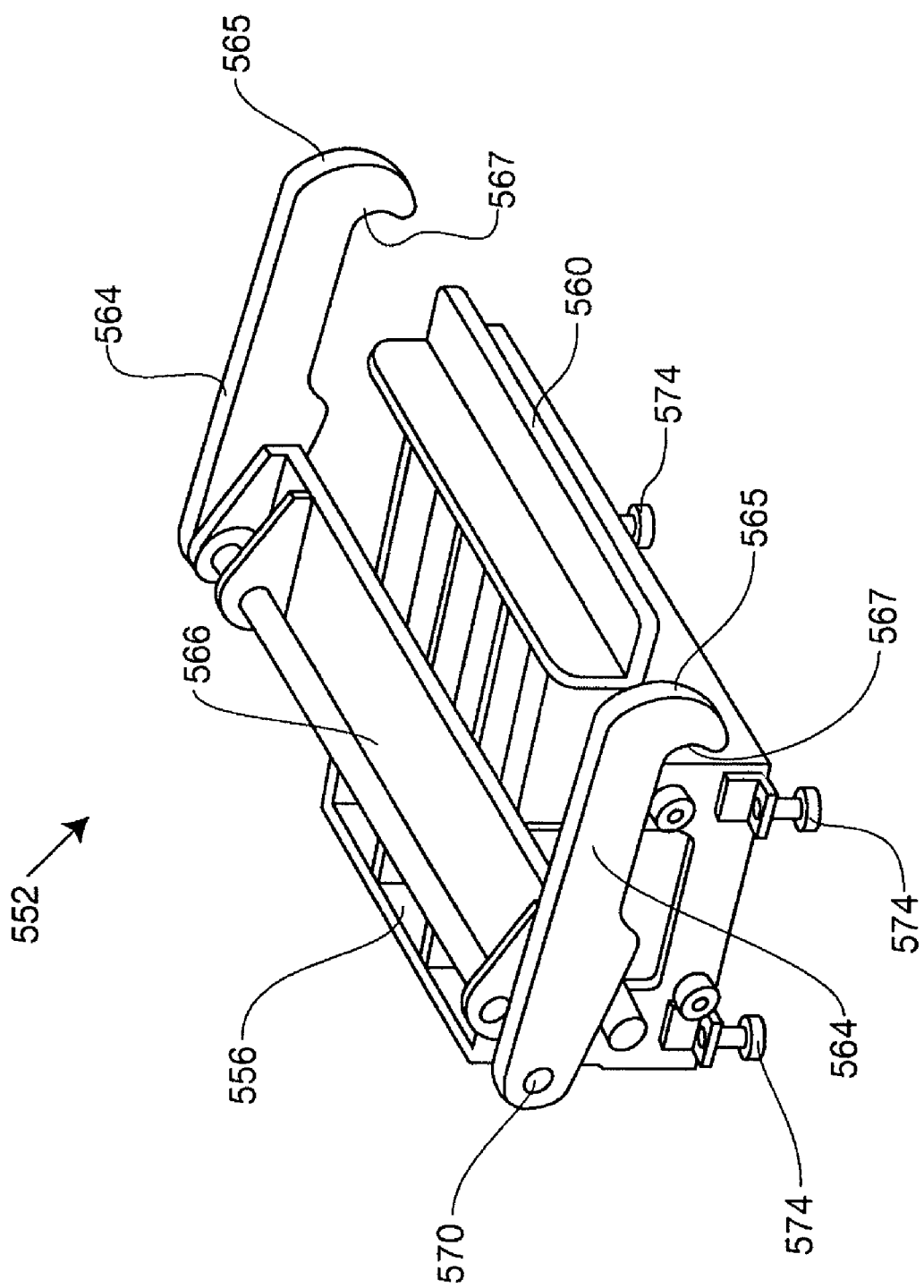
FIG. 15 is a close-up view of a mobile member of the container-conveyor of FIG. 14.

FIG. 15 shows a close-up of mobile member 552 of FIG. 13 disconnected from container-conveyor 540. In this figure, rollers 574 for reducing friction as mobile member 552 moves through channel 554 are visible.

Figure 16:
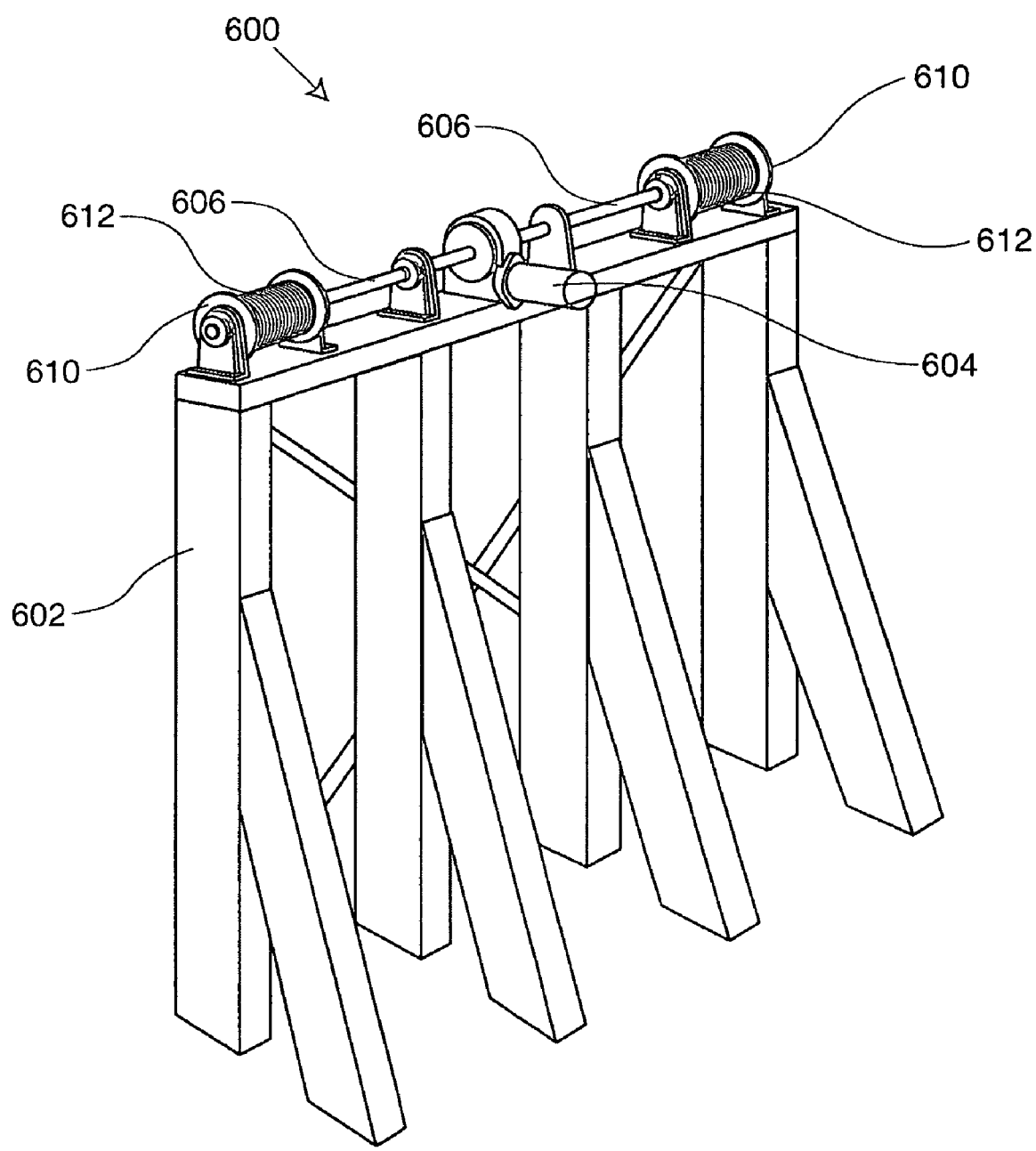
FIG. 16 is a view of another embodiment of the winch of the invention.

FIG. 16 shows one embodiment of a winch 600 of the present invention. Winch 600 is adapted to be mounted on vehicle, for example the vehicle of FIG. 13, and is configured to enable winching a storage container (not shown). In this figure, winch 600 attaches to winch support 602 for connecting winch 600 to the desired vehicle at the desired location. Other embodiments may not require winch support 602, and may attach winch 600 to other parts of the vehicle such as a vehicle cab or vehicle frame.

Winch 600 includes a motor 604, a shaft 606 turned by the motor 604, at least one spool 610 driven by the shaft 606, and at least one cable 612 wound around the spool 610. The terminal end of cable 612 also includes a faster (not visible in this figure), such as a lug, hook, carabineer, or loop for connecting to a container (not visible in this figure). Those skilled in the art would recognize that a variety of winch configurations could be used to achieve the present kit component, for example, any number of spools, motors, and cables could be combined. Similarly, those skilled in the art will recognize that various cable, belt, rope, or chain take-up mechanisms can be used, all of which are considered as encompassed by the term "winch".

Figure 17:
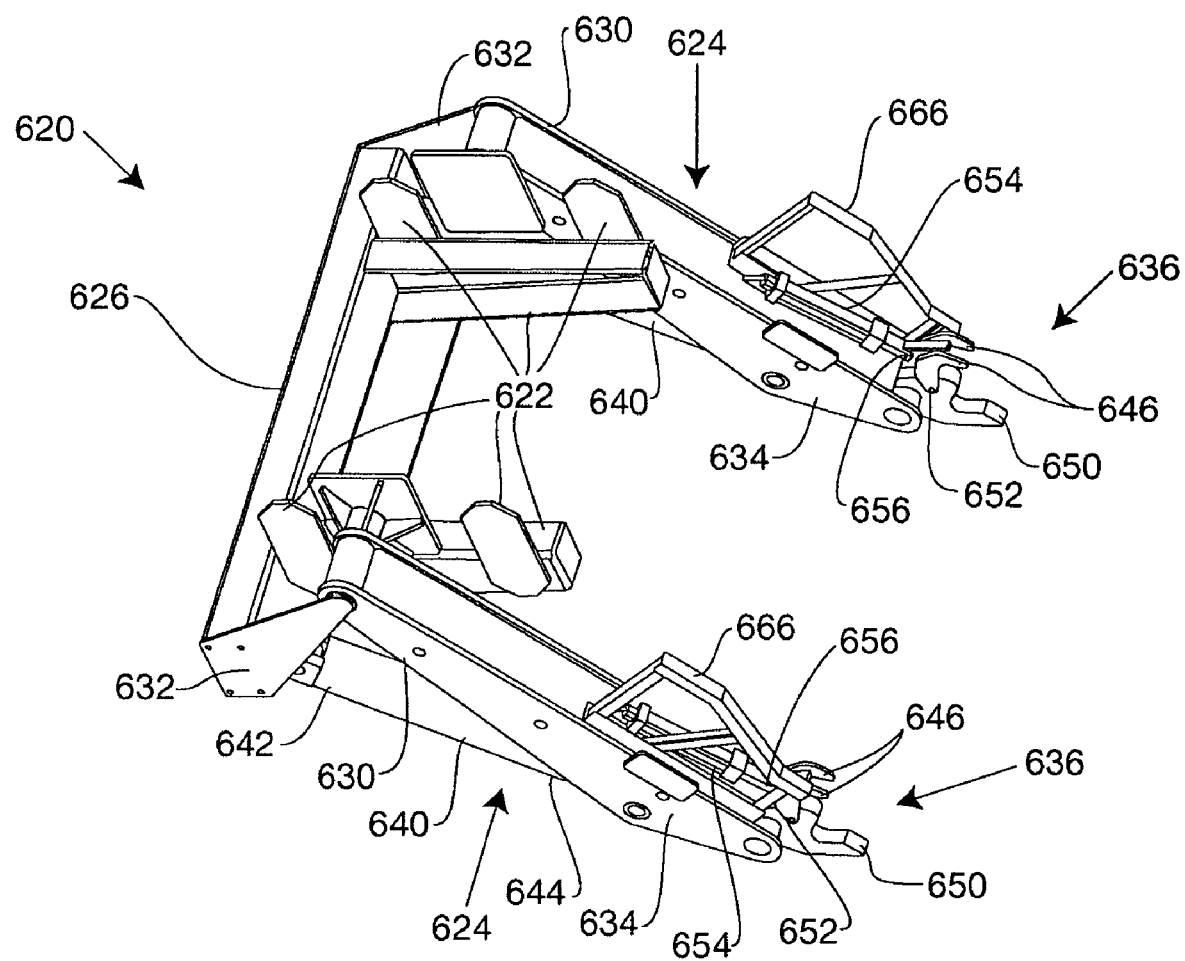
FIG. 17 is a view of another embodiment of a lift of the invention.

FIG. 17 shows a lift 620 of the present invention. Lift 620 is adapted to be mounted on a vehicle, in part by lift-mounts 622 and lift weldment 626, which may be attached to a vehicle frame for example. The lift 620 includes a pair of lift-arms 624. Each lift arm 624 has a first end 630 pivotally connected to tie plates 632 of lift weldment 624 and a second end 634 connected to a container-engager 636, which is, in this embodiment, a clasp 636. A lift-drive 640 has a first end 642 pivotally connected to lift weldment 626, and a second end 644 pivotally connected to lift-arms 624. In the preferred embodiment the lift-drive 64 is a hydraulic cylinder with a 4" bore and 15" stroke, but, still within the scope of the invention, others may prefer other drives, such as pneumatic, for example, or other hydraulic drives of other sizes.

The clasp 636 connected to the second end 630 of the lift arm 624 includes a top jaw 646 and a bottom jaw 650 for securely grasping the container grips. In this embodiment of the clasp 636, the top jaw 646 is pivotally connected to bottom jaw 650 at pivot point 652. A drive 654 is mounted to open and close the clasp 636 and attaches to the top jaw 646 at pivot point 656. Preferably drive 654 is a hydraulic drive, even more preferably a hydraulic cylinder with a 1⅜" bore and a 6" stroke. Others may prefer other drives. By closing the top jaw 646 through the hydraulic drive 654, a container grip can be held by clasp 636.

This embodiment also includes a deflector arm 666 for protecting the drive 654 of the lift arm from unwanted contact with elements of the mobile member 552 or the storage container.

Figure 18:
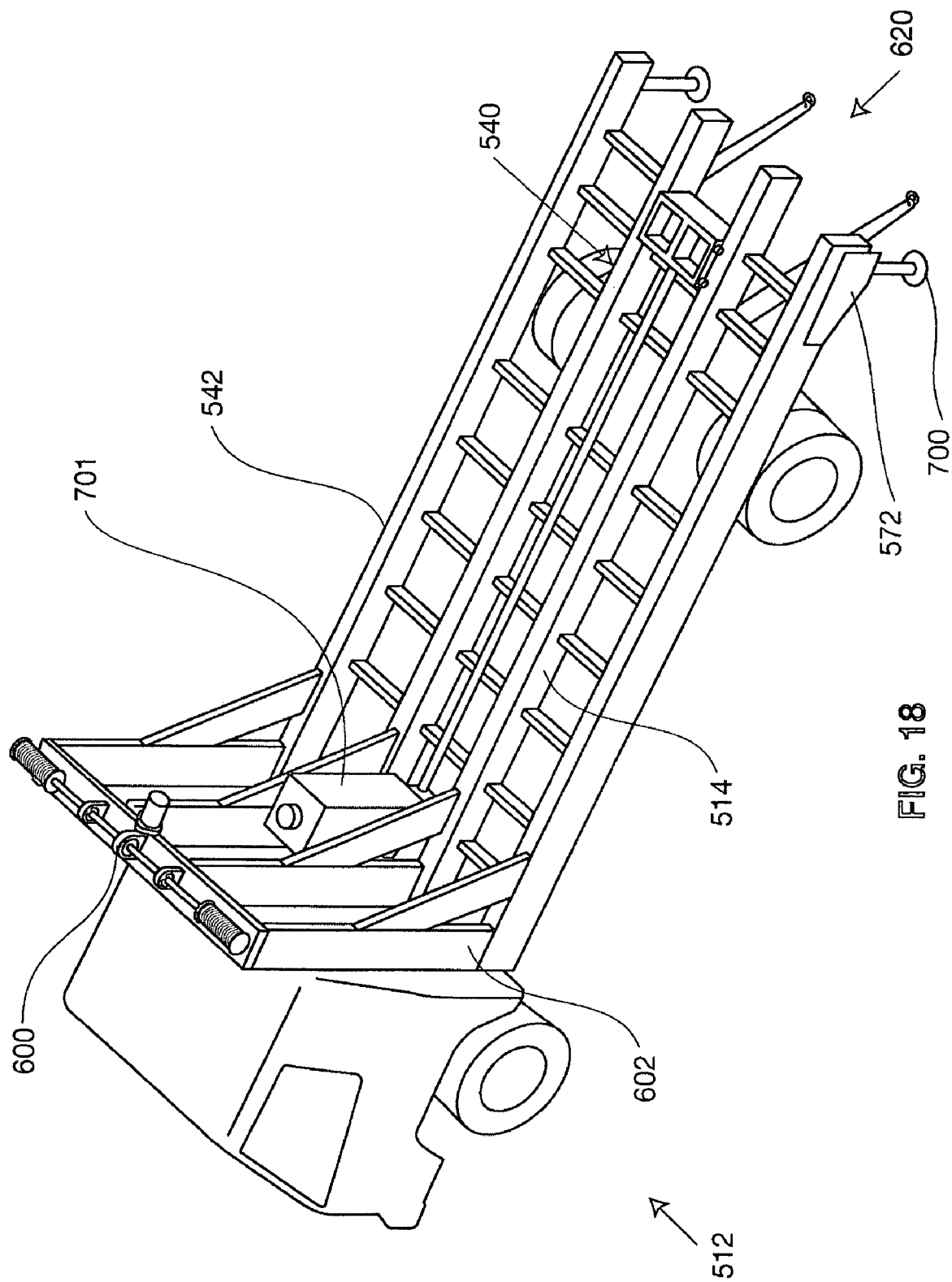
FIG. 18 is a view of the truck of FIG. 13 supplied with the some components of one embodiment of the present invention.

FIG. 18 shows truck 512 of FIG. 13 fitted with components from the kit of the present invention. Truck 512 includes a container-conveyor 540 mounted to truck frame 514 through mountable frame 542. A motor 701 has also been added, which in this embodiment can drive container-conveyor 540 or lift 620. Winch 600 mounts to truck 512 through winch support 602. Lift 620 mounts to truck 512 through lift-mounts 622 (see FIG. 17) or lift weldment 626 (see FIG. 17). Adjustable footings 700 have also been added to increase the stability of the truck. Preferably drive controls and/or micro processing controls for coordinating the winch, the container-conveyor, and the lift are located, at least in part, in control panel 572.

Figure 19:
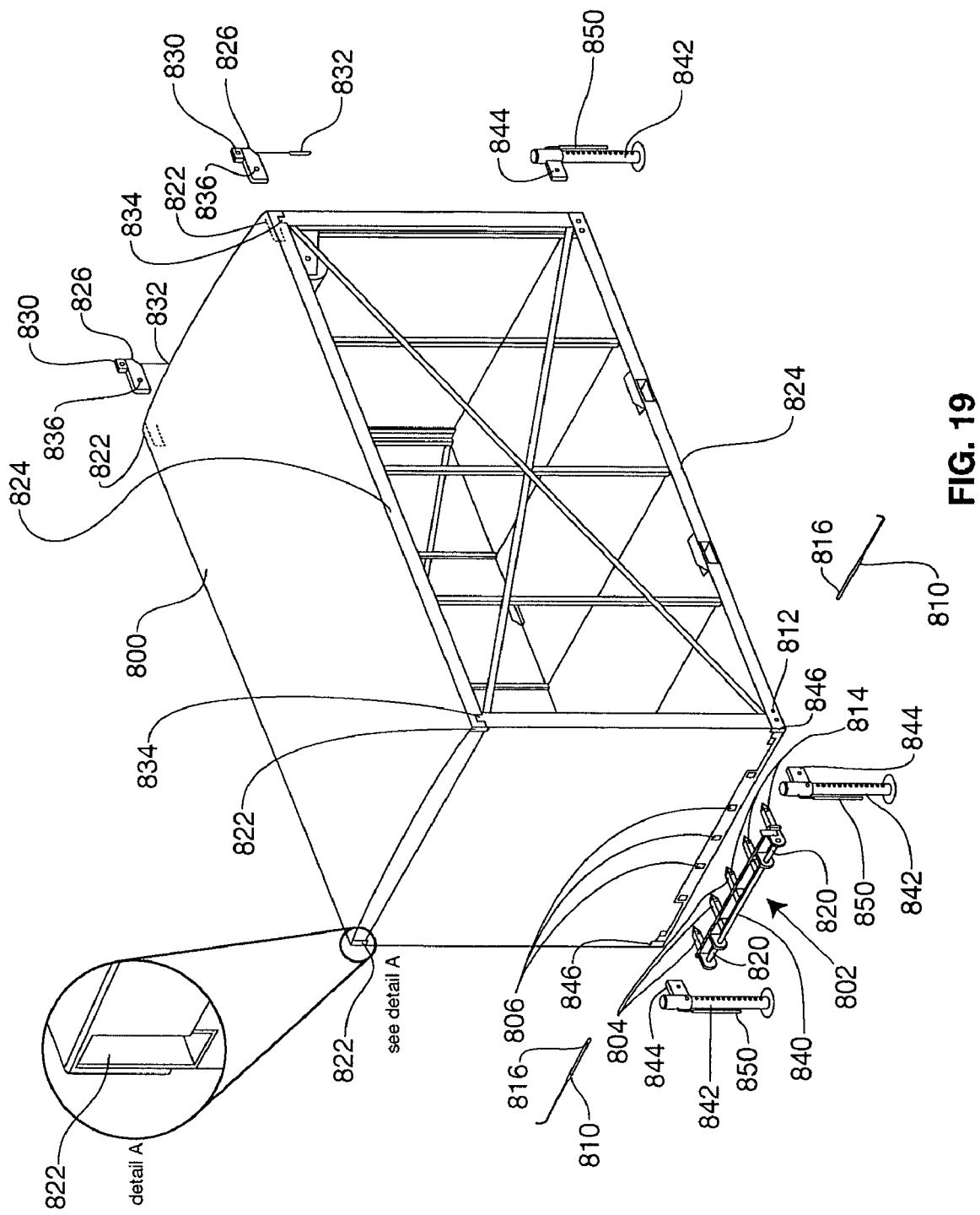
FIG. 19 is a view of another embodiment of the storage container of the invention.

FIG. 19 shows structural elements of a preferred embodiment of the storage container 800 of the present invention. In this embodiment, the lift-interface of storage container 800 is a removable lift-fork 802. Lift-fork 802 includes prongs 804 for engaging prong-recesses 806 of storage container 800. Once engaged, lift-fork 802 is secured to storage container 800 with linking pin 810. Linking pin 810 is received by hole 812 of storage container 800 and by prong-holes 814 of lift-fork 802. Applicants prefer to reinforce portion 816 of the linking pin 810, which is the portion of the linking pin 810 threaded through prong-holes 814 to assure sufficient shear strength.

When lift-fork 802 is secured to storage container 800, grips 820 can be clasped by the lift (not shown in this figure) and storage container 800 can be lifted or lowered. Additionally, member-clasps (not shown in this figure) of the mobile member (not shown in this figure) may engage grips 820. Portion 840 of lift-fork 802 may also serve as container-conveyor-interface, yet some may also desire to use the outer wall of the container as the container-conveyor-interface, or the prong-recesses 806 as the container-conveyor-interface. Similarly, the prong recesses 806 may serve as a lift-interface in other embodiments. All such variations are within the scope of the present invention.

FIG. 19 also shows a preferred embodiment of the winch-interface 822 of the present invention. In this embodiment, the winch-interface is an opening or recess defined by a portion or portions of the container 800. The opening or recess 822 may be defined by frame portions 824 or by additional portions added to serve as winch-interfaces. Also, the openings or recesses may run the length of the storage container or be confined to a particular location.

Winch-interfaces 822 are configured to receive cable lugs 826 attached at ends of winch cables (not shown in this figure) at shackles 830. Others may prefer other types of lugs or other ways to connect cables to lugs, all of which are in the scope of the present invention.

Cable lugs also include lug pins 832. Once lugs 826 are inserted into winch-interfaces 822, lugs 826 are secured by inserting pins 832 into holes 834 of storage container 800 and holes 836 of cable lugs. Once secured, winching through winch (not shown in this figure) can be achieved.

FIG. 19 also shows removable container legs 842. Container legs 842 include leg-lugs for inserting into leg-recesses 846 and pin 850 for securing legs 842 therein. Container legs further include jacks for regulating the position of containers on the ground.

Applicants prefer the above described container 800, lift-interface 802, winch-interface 822, and legs 842 for various reasons. For example, the mentioned embodiments allow multiple storage containers, with lift-interfaces, winch-lugs, and legs removed, to be stored closely together. The above-mentioned embodiments also reduce the cost of the storage containers by decreasing the number of parts required to be produced per container. Further, for example, a single storage container may receive a lift-fork at either end or at ether side, thus allowing a storage container to be lifted from any side with only a single lift-fork.

Numerous characteristics and advantages have been set forth in the foregoing description, together with details of structure and function. The novel features are pointed out in

What is claimed is:

1. A system for transporting, loading, and unloading storage containers in a substantially level position, the system comprising:
 a vehicle including a frame capable of receiving a storage container;
 a storage container sized for being removably received by the frame and having
  a winch-interface,
  a container-conveyor-interface, and
  a lift-interface;
 a winch mounted on the vehicle for winching at the winch-interface of the storage container;
 a container-conveyor mounted on the vehicle for connecting to the container-conveyor-interface of the storage container; and
 a lift mounted on the vehicle for connecting to the lift-interface of the storage container, the lift and the winch configured to cooperate with one another to support the storage container substantially level as the storage container is lowered from or raised to the vehicle frame.

2. The system of claim 1, wherein the winch-interface is defined by at least one ear connected to the container.

3. The system of claim 1, wherein the winch-interface is an opening on the container.

4. The system of claim 1, wherein the container-conveyor-interface is an opening on the container capable of receiving the container-conveyor.

5. The system of claim 1, wherein the container-conveyor-interface is a surface.

6. The system of claim 1, wherein the lift-interface is a grip.

7. The system of claim 1, wherein the lift-interface is an opening defined by the container.

8. The system of claim 1, wherein the lift-interface includes a flange.

9. The system of claim 1, wherein the container-conveyor is a screw conveyor.

10. The system of claim 9, wherein the screw-conveyor includes a mobile member.

11. The system of claim 10, wherein the mobile member includes a lip.

12. The system of claim 10, wherein the mobile member includes a member-clasp.

13. The system of claim 10, wherein the mobile member is configured to interface with the container-conveyor-interface.

14. The system of claim 1, wherein the container-conveyor has a hydraulic drive.

15. A system for transporting, loading, and unloading storage containers in a substantially level position, the system comprising:
 a vehicle including a frame capable of receiving a storage container;
 a storage container sized for being removably received by the frame and having
  a winch-interface,
  a container-conveyor-interface, and
  a lift-interface;
 a winch mounted on the vehicle for winching at the winch-interface of the storage container;
 a container-conveyor mounted on the vehicle for connecting to the container-conveyor-interface of the storage container; and
 a lift mounted on the vehicle for connecting to the lift-interface of the storage container, the lift and the winch cooperatively supporting the storage container substantially level as the storage container is lowered from or raised to the vehicle frame, wherein the lift includes:
  a lift-arm;
  a lift-drive connected to the lift-arm for raising and lowering the lift-arm; and
  a container-engager connected to the lift-arm for engaging the container.

16. The system of claim 15, wherein the lift-arm has a first end pivotally connected to the frame and a second end connected to the container-engager.

17. The system of claim 16, wherein the lift-drive has a first end connected to the frame and a second end connected to the lift-arm.

18. The system of claim 17, wherein the first end of the lift-drive is pivotally connected to the frame and wherein the second end of the lift-drive is pivotally connected to the lift arm, whereby the lift drive is capable of raising and lowering the lift-arm.

19. The system of claim 15, wherein the container-engager is a clasp.

20. The system of claim 19, wherein the clasp includes
 a first jaw,
 a second jaw pivotally connected to the first jaw, and
 a drive connected to the first jaw for opening and closing the first jaw relative to the second jaw.

21. A system for transporting, loading, and unloading storage containers in a substantially level position, the system comprising:
 a vehicle including a frame capable of receiving a storage container, the frame having an upper-fore portion, a lower-fore portion, a lower-rear portion, and a base;
 a storage container having an upper-region and a lower region and sized for being removably received by the frame, the container further having
  a winch-interface located at the upper-region,
  a container-conveyor-interface located at the lower-region, and
  a lift-interface located that the lower-region;
 a winch mounted on the upper-fore portion of the frame for connecting to the winch-interface of the storage container;
 a container-conveyor mounted on the base of the frame adapted for connecting to the container-conveyor-interface of the storage container and moving the storage container on the base; and
 a lift mounted on the lower-rear portion of the frame for connecting to the lift-interface of the storage container and raising and lowering the container.

22. A vehicle for transporting, loading, and unloading storage containers in a substantially level position, the storage containers having a winch-interface, a container-conveyor-interface, and a lift-interface, the vehicle comprising:
 a frame connected to the vehicle;
 a winch mounted on the frame adapted for connecting to the winch-interface of the storage container;
 a container-conveyor mounted on the frame and adapted for connecting to the container-conveyor-interface of the storage container and conveying the storage container in a substantially level position; and
 a lift connected to the frame adapted for connecting to the lift-interface of the storage container and raising and lowering the container, the lift and the winch configured to cooperate with one another to support the storage container substantially level as the storage container is lowered from or raised to the vehicle frame.

23. The system of claim 22, wherein:
the frame further includes an upper-fore portion, a lower-fore portion, a lower rear portion, and a base;
the winch mounts to the upper-fore portion of the frame;
the container-conveyor mounts to the base of the frame; and
the lift connects to the lower-rear portion of the frame.

* * * * *

UNITED STATES PATENT AND TRADEMARK OFFICE
CERTIFICATE OF CORRECTION

| | | |
|---|---|---|
| PATENT NO. | : 7,563,065 B1 | Page 1 of 1 |
| APPLICATION NO. | : 11/406154 | |
| DATED | : July 21, 2009 | |
| INVENTOR(S) | : Ervon Ray Bennett | |

It is certified that error appears in the above-identified patent and that said Letters Patent is hereby corrected as shown below:

On the Title page, item [76] inventor's first name should be Ervon

Signed and Sealed this

Twenty-sixth Day of October, 2010

David J. Kappos
*Director of the United States Patent and Trademark Office*